United States Patent Office 3,258,148
Patented June 28, 1966

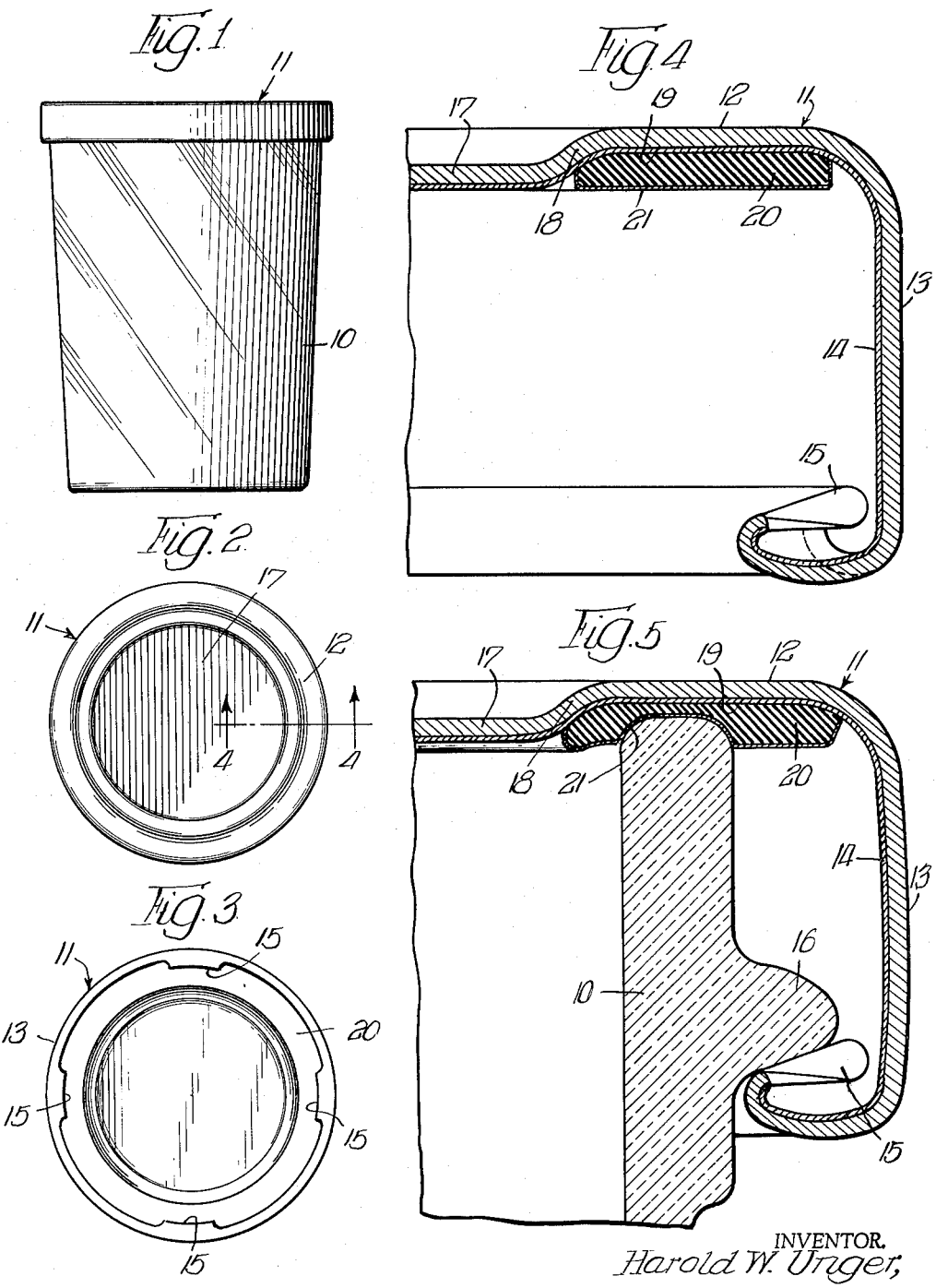

3,258,148
CONTROLLED TORQUE CLOSURE MEMBERS
AND GASKETS THEREFOR
Harold W. Unger, Elmhurst, Ill., assignor to Continental Can Company, Inc., New York, N.Y., a corporation of New York
Filed Apr. 16, 1962, Ser. No. 187,642
11 Claims. (Cl. 215—40)

This invention is directed to new and improved closure members, particularly rotatable caps, and new and improved gasketing means therefor, which when used in establishing a hermetic seal with a container, exhibit improved closure member removal properties with regard to the magnitude of force that must be applied for container opening purposes.

In my earlier work set forth in Patent No. 2,874,863 attention was given to the basic concept of preparing a new and improved controlled torque gasket composition of the plastisol type. It was found that the incorporation of certain prescribed lubricants in the basic plastisol gasket composition results in the forming of a surface coating of the lubricants on the container engaging surface portions of the gasket, which coating, upon gasket application through rotatable cap means to a container finish, prevents the establishing of excessive frictional "grab" or seizure between the gasket and the container finish. In essence, it was found that the special lubricant coating uniquely permits the establishing and maintaining of a complete hermetic seal, as required in the packaging of food and the like, while also exhibiting a control over the buildup of excessive frictional forces which, if present, would necessitate the application of an opening torque or force of an undesirable magnitude.

This earlier development, among other things, involves the use of silicone fluid either as the sole lubricant or preferably in combination with lecithin and/or paraffin. As compared to the silicone-type material to be described hereinafter, the silicone fluid used in the earlier development is of comparatively low viscosity, this material being preferably incorporated in the plastisol-type gasket material itself and in combination with one or more of the other uniquely compatible lubricant materials.

In further considering the use of a silicon-type material as the sole lubricant, it has been found that the silicone fluid of the earlier preferred viscosity of about 350 centistokes exhibits a decrease in efficiency as an opening torque control agent if substantial time elapses between closure member application and subsequent closure member removal. This loss in efficiency has been noted particularly in connection with the use of the relatively low viscosity silicone fluid as a separate coating applied to a pre-formed cut rubber gasket of known type. It was first considered that the loss of efficiency might be explained on the basis that the low viscosity silicone fluid is not as effective when used alone in the absence of the other specifically designated lubricants, it being preferred that the plastisol-type gasket materials include as a part of the composition thereof the combination of all three earlier specified lubricants. It was also thought that possibly the silicone fluid alone might be limited in its use with regard to the type gasket material with which it could be efficiently used.

However, upon further consideration of the problem of loss of opening torque control efficiency exhibited by a silicone-type coating over extended container sealing time, it has been found that by the use of a silicone-type material exhibiting a very much greater viscosity, the loss of efficiency in controlled opening torque characteristics, particularly with regard to cut rubber or elastomeric type gaskets to which the material is applied as an external coating, is overcome. Furthermore, it has been found that a materially improved control of opening torque is available with the use of the siloxane polymers of very high viscosity, especially when applied to elastomeric material gaskets.

It is an object of the invention to provide a new and improved closure member and gasketing means therefor exhibiting new and improved opening torque control to aid in ease of closure member removal from a container with which the closure member and gasketing means have established a hermetic seal.

A further object is to provide new and improved opening torque control for closure members, particularly rotatable caps, and gaskets forming a part thereof, the control being established by the use of an interface coating of a very high viscosity siloxane polymer preferably of the type known as a silicone gum.

Still a further object is to provide a new and improved closure member and gasketing means involving the combination of pre-formed rubber gasket material and a surface coating of a very high viscosity siloxane polymer capable of maintaining closure member removal torques in a desirable range of magnitude even after extended sealed application of the closure member and gasketing means with a container.

Other objects not specifically set forth will become apparent from the following detailed description of the invention made in conjunction with the accompanying drawings wherein:

FIG. 1 is an elevation of a typical sealed container using the improved closure member and gasketing means of the present invention;

FIG. 2 is a top plan view of the closure member;

FIG. 3 is a bottom plan view of the closure member;

FIG. 4 is an enlarged fragmentary section of a portion of the closure member illustrating the use of the improved gasketing means therein, this view being taken generally along line 4—4 in FIG. 2; and FIG. 5 is a view similar to FIG. 4 illustrating the sealing function of the gasketing means upon application of the closure member to a container.

The invention involves the use of a coating of a siloxane polymer exhibiting a high viscosity on the order of at least about 60,000 centistokes, preferably within the range from about 60,000 centistokes to about 40 million centistokes, the coating being applied to the surface portion or portions of a gasketing means, particularly a cut rubber ring, which is operatively mounted in a closure member and is adapted to establish a hermetic seal with surface portions or the finish of a container. The siloxane polymers capable of use in carrying out the invention may be generally classified as silicone fluids and gums, bearing in mind the high viscosity requirements set forth above.

It is generally recognized that silicone fluids exhibiting viscosities up to 1,000 centistokes are classified as ordinary or low viscosity materials. Silicone fluids exhibiting viscosities from about 1,000 centistokes to around 2 million centistokes are classified as high viscosity fluids. Silicone gums are generally those polymers which exhibit viscosities ranging up to 40 million centistokes and more. The gums adapted for use in the present invention are not actually rubbery but are extremely high viscosity fluids which are clear, colorless and which may be described as exhibiting the appearance and quality of a soft wax. Such polymers are well known and used as commercial gums for the manufacture of silicone rubber. Typical types of silicone gums include the dimethylpolysiloxanes, the methyl-vinylsiloxanes and the phenyl-containing siloxanes. The dimethylpolysiloxanes are readily available as high viscosity fluids and gums. These polymers are prepared by the hydrolysis of dimethyldichlorsilane with aqueous hydrochloric acid followed by purification and heat polymerization, the gums being catalytically polymerized at temperatures from about 150° to 200° C. Compositions and properties may be varied as by copolymerization with other difunctional silicones such as diethyl silicone, methyl phenyl silicone, methyl vinyl silicone, etc. Examples of silicone gums available from Dow Chemical Company, Midland, Michigan are as follows:

|  | Viscosity, centistokes (approx.) |
|---|---|
| Silastic 430 | 18,000,000 |
| Silastic 400 | 11,700,000 |
| Silastic 410 | 11,000,000 |
| Silastic 401 | 9,400,000 |
| Silastic 440 | 9,400,000 |

A high viscosity silicone fluid suitable for use with the present invention can be selected from the Dow-Corning Company, Midland Michigan, dimethylpolysiloxane DC–200 series including fluids ranging in viscosity at room temperature up to about 1,000,000 centistokes. From this series the selected fluids would exhibit viscosities starting from about 60,000 centistokes. Any suitable silicone fluid or gum may be used in carrying out the invention providing the fluid or gum exhibits the requisite viscosity.

The siloxane polymer coating is applied to the seal defining surface portion of the closure member gasket adapted to contact the container to establish at least a substantially continuous interface between the gasket and container for the control of closure member removal torque or force. The accompanying drawing illustrates a basic use of the coating of the present invention. In FIG. 1 a glass container 10, such as an ordinary jelly glass, is sealed with a closure cap 11. The closure cap 11 is of the type shown in FIGS. 2–4 consisting of a cap body or shell having a top panel 12 and a depending skirt portion 13. The cap body or shell is stamped out from suitable coated tin plate, although other materials may be used. Generally, the tin plate is enameled on the exterior and the interior is enameled or covered with a known type of lacquer formulation so as to form a protective coating 14 to prevent contact between the metal of the cap and the product in the container 10. The bottom edge of the depending skirt portion 13 is normally rolled to reinforce this edge while providing a neat appearance and removing the sharp edge which is left when the cap shell or body is stamped out. The closure cap illustrated is provided with a plurality of lugs 15 for cooperative cap clamping engagement with circumferentially spaced glass threads or lugs 16 integrally formed on the exterior of the open end neck portion of the glass container 10 as shown in FIG. 5.

The top panel 12 of the cap 11 is provided with a central depressed portion 17 which defines a continuous annular shoulder 18 inwardly of the skirt 13. The shoulder 18 and skirt 13 thus define therebetween an annular gasket-receiving channel 19. A cut ring gasket 20 is carried in the channel 19. This gasket may be formed from any suitable material such as rubber or the like. Application of the cap 11 to the container 10 is shown in FIG. 5 with the top edge or finish of the open neck portion of the container 10 (which is generally referred to as the sealing finish) being forced into the gasket 20. In this respect the gasket 20 is compressible to the extent that material deformation thereof occurs upon the application of the cap 11 to the container 10 and the container edge portion is, in effect, embedded in the gasket. Removal of the cap 11 from the container 10 requires the application of an opening torque or force and the magnitude of this torque or force is controlled within reasonable limits by the presence of a siloxane polymer coating 21 applied to the exposed surface portions of the gasket 20. This coating is of sufficient thickness to preferably fully cover the container finish engaging surface portions of the gasket 20 to set up therebetween an interface which is capable of maintaining hermetic sealing conditions while preventing the development of excessive forces of seizure or "grab" between the gasket and container. Such excessive forces of seizure or "grab" would normally develop over extended periods of time if it were not for the special coating of the present invention establishing the aforementioned interface.

As described above, earlier experience with coatings of low viscosity silicone fluid applied to rubber gaskets indicated a loss of efficiency in opening torque control over extended periods of time. It has been found that the low viscosity silicone fluid is subject to "squeeze out" from the interface between the gasket and container, and is not capable of acting as a lubricant of sufficient film strength to continuously resist the seizure or "grab" caused by the continued force of gasket against glass. Furthermore, the low viscosity silicone fluid is more subject to absorption into the rubber gasket material thus reducing the effectiveness thereof. Comparative tests have been conducted with regard to opening torque requirements through extended periods of time in connection with the use of low viscosity silicone fluid, intermediate viscosity silicone fluid and the higher viscosity materials of this invention. Commercial processing conditions have been utilized involving cap application by automatic capping machines, heat processing of the containers and the like. Caps containing rubber gaskets coated with silicone fluid having a viscosity of 350 centistokes were applied to containers under normal conditions and the capped containers were allowed to stand during a period of time ranging from 9 days to 213 days. Upon cap removal from some of these containers after 9 days storage, the average opening torque required was 36.7 inch-pounds. After 26 days the opening torque had increased to 39.3 inch-pounds and after 128 days the opening torque had still further increased to 41.3 inch-pounds. With the use of silicone fluid having a viscosity of about 10,000 centistokes, little difference in opening torque variation was noted, the opening torque after 9 days being 32 inch-pounds but after 128 days having increased to 39.3 inch-pounds. With silicone fluid having a viscosity of 60,000 centistokes, the opening torque after 9 days was 29.7 inch-pounds, but after 213 days was as low as 26.3 inch-pounds. Silicone fluid having a viscosity of 1 million centistokes exhibited similar results in that the opening torque after 213 days was 26.0 inch-pounds.

Silicone gums exhibit even more substantially improved results. By way of example, tests run with different types of silicone gums provided opening torque results ranging from about 14.9 to 17.2 inch-pounds after 77 days of storage. The gums used include those listed above of the Silastic 400 series. In all instances a complete hermetic seal was established and maintained during the time of the tests and no leakers were developed. In these tests 53 mm. caps were used. Obviously, the magnitude of opening torques will vary with the size of cap used but the foregoing results are indicative of the relative values of the various coating materials. In carrying out the tests, the containers were subjected to heat processing in known types of retort equipment for one-half hour at 240° F. The silicone gums and high viscosity silicone fluid are preferably applied as a coating in the form of a 5% solution using a suitable solvent. In the tests toluol was used as the solvent. Other suitable solvents include xylol, 1,1,1, trichlorethane, etc.

The rubber gaskets were dipped in the appropriate solutions and any excess material was removed by centrifuging. The solvated polymer may be poured into the cap containing the gasket fixed therein if desired. Where rubber gaskets are used and such gaskets are prepared from sheet stock material, one surface of the stock material may be coated with the solvated polymer and the subsequently cut gaskets may be applied with their coated surfaces available for container contact. A 5% solution of the siloxane polymer provides an adequate quantity of polymer coating on the gasket but variations in the amount used are permissible. It will be noted that the silicone gums reduce the opening torque to as much as one-half of that required when using the low viscosity silicone fluid. The use of silicone fluid having a viscosity on the order of 10,000 centistokes is of no greater value as compared to the use of the low viscosity fluid.

Obviously, certain modifications and variations of the invention as hereinbefore set forth may be made without departing from the spirit and scope thereof, and therefore only such limitations should be imposed as are indicated in the appended claims.

I claim:

1. A closure member for application to a container to establish a hermetic seal therewith, said closure member comprising a top panel and depending skirt means for gripping a container surface portion, compressible rubber gasketing means mounted in said closure member for sealing application against a container finish, and a coating of a siloxane polymer having a viscosity on the order of at least about 60,000 centistokes applied to the surface portions of said gasketing means adapted for contact with said container finish.

2. The closure member of claim 1 wherein said siloxane polymer is a silicone fluid.

3. The closure member of claim 1 wherein said siloxane polymer is a silicone gum.

4. In a closure member adapted for application to a container to establish a hermetic seal therewith, said closure member including a top panel and depending skirt means for gripping a container surface portion and a compressible rubber gasketing means mounted in said closure member for sealing application against a container finish, the provision of a coating of a siloxane polymer having a viscosity on the order of at least about 60,000 centistokes applied to the surface portions of said gasketing means adapted for contact with said container finish, said coating being applied as a solution containing about 5% siloxane polymer and a volatile solvent.

5. A closure member for application to a container to establish a hermetic seal therewith, said closure member comprising a top panel and depending skirt means for gripping a container surface portion, a compressible rubber gasketing means mounted in said closure member for sealing application against a container finish, and a coating of a siloxane polymer having a viscosity within the range of from about 60,000 centistokes to about 40 million centistokes, applied to the surface portions of said gasketing means adapted for contact with said container finish.

6. A rotatable cap for application to the open end neck portion of a container to establish a hermetic seal with the finish thereof, said cap comprising a top panel and depending container lug engaging skirt, a ring shaped rubber gasket mounted in said cap for compressed sealing engagement with the top edge finish of said open end neck portion, and a coating of a siloxane polymer having a viscosity on the order of at least about 60,000 centistokes applied to the exposed surface portion of said gasket.

7. The cap of claim 6 wherein said siloxane polymer is a silicone fluid.

8. The cap of claim 6 wherein said siloxane polymer is a silicone gum.

9. A rotatable cap for application to the open end neck portion of a glass container to establish a hermetic seal with the glass finish thereof, said cap comprising a top panel and depending container lug engaging skirt, a ring shaped rubber gasket mounted in said cap against the inner surface of said top panel for compressed sealing engagement with the top edge of said open end neck portion, and a coating of a siloxane polymer having a viscosity within the range from about 60,000 centistokes to about 40 million centistokes applied to the exposed surface portion of said gasket.

10. Gasketing means for use with a rotatable cap to establish a hermetic seal with a container, said gasketing means being formed from rubber material with the exposed surface portions thereof adapted for container contact having thereon a coating of a siloxane polymer having a viscosity on the order of at least about 60,000 centistokes.

11. Gasketing means for use with a rotatable cap to establish a hermetic seal with a container, said gasketing means being formed from rubber material with the exposed surface portions thereof adapted for container contact having thereon a coating of a siloxane polymer having a viscosity within the range from about 60,000 centistokes to about 40 million centistokes.

References Cited by the Examiner

UNITED STATES PATENTS

| | | | |
|---|---|---|---|
| 2,649,090 | 8/1953 | Parsons et al. | 215—47 |
| 2,771,422 | 11/1956 | Browning et al. | 260—46.5 |
| 2,841,304 | 7/1958 | Zipper | 215—40 |
| 2,863,897 | 12/1958 | Wehrly | 260—46.5 |
| 2,874,863 | 2/1959 | Unger et al. | 215—40 |
| 2,961,425 | 11/1960 | Pierce et al. | 260—46.5 |
| 3,061,578 | 10/1962 | Nitzsche et al. | 260—46.5 |
| 3,068,194 | 12/1962 | Pike | 260—46.5 |

OTHER REFERENCES

"Silicones and Their Uses" (by Rob Roy McGregor), published by McGraw-Hill Book Co., Inc., pages 201 and 220 relied on. (Copy in Scientific Library.)

"Silicones" (by Meals and Lewis), published by Reinhold Publishing Corp., N.Y., page 164 relied on. (Copy in Scientific Library and Divisions 50 and 60.)

THERON E. CONDON, *Primary Examiner.*

EARLE J. DRUMMOND, *Examiner.*

J. J. HOEY, J. M. CASKIE, *Assistant Examiners.*